C. DITTMAN.
Improvement in Elastic Washers.

No. 128,602. Patented July 2, 1872.

Witnesses:
G. Matthys.
A. W. Hart

Inventor:
Casper Dittman.
Per
Attorneys.

UNITED STATES PATENT OFFICE.

CASPER DITTMAN, OF LEACOCK, PENNSYLVANIA.

IMPROVEMENT IN ELASTIC WASHERS.

Specification forming part of Letters Patent No. 128,602, dated July 2, 1872; antedated June 18, 1872.

Specification describing certain Improvements in Elastic Washers, invented by CASPER DITTMAN, of Leacock, in the county of Lancaster and State of Pennsylvania.

My invention pertains to improvement in the construction of elastic washers of the class wherein the rubber or other packing is inclosed so as to be protected from injury by reason of the torsional action of the nut. The invention consists in the arrangement of a face-plate or follower having a radial tube to receive the screw-bolt, in connection with a socket for holding the elastic packing.

The effect of my construction and arrangement of said parts is to allow the nut, when screwed home, to follow the face-plate into the socket, and thus project a correspondingly less distance beyond the socket than it otherwise would. It is consequently less exposed to injury from various causes, and the socket has incidentally also a broader bearing-surface, and will hence not turn with the nut when made smooth, or when oil or other lubricant has been accidentally or otherwise applied to it.

A shorter screw-bolt may likewise be used with safety in connection with my washer than with others of like thickness.

Figure 1:
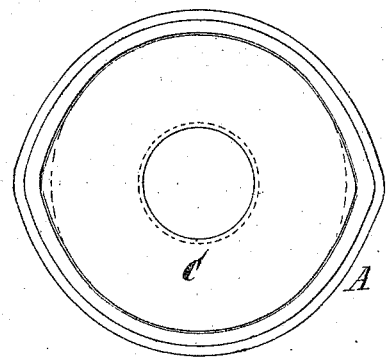
Figure 2:
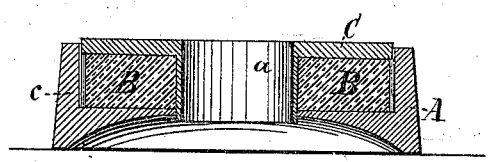

In the drawing, Figure 1 represents a face view of my compound washer, and Fig. 2, a central cross-section thereof.

A indicates the flanged disk or socket; B, the elastic packing; and C, the disk-shaped metallic follower or face-plate. A central aperture is formed in each of these, of suitable size to receive a screw-bolt or other device to which the washer is to be applied. A tube, $a$, is attached to or preferably formed in one piece with the face-plate, so as to form a prolongation of the aperture therein, as clearly shown in Fig. 2. The tube passes through the packing C and the base of the flanged disk A, which is arched to leave space for the tube to work freely without danger of coming in contact with the fish-plate or other bearing-surface of the washer. The flange $c$ of the disk may be inclined or beveled exteriorly, but should have a vertical inner wall, as shown, so that the follower and packing may have free movement therein. The packing may be of rubber or any other suitable elastic substance. As shown in Fig. 1 the disk and face-plate have an oval or elliptic form, which prevents the movement of the former upon the packing.

I am aware of the fact that elastic packing has been so confined between a socket and follower as to be removed from contact with the screw-bolt and nut, as in the patent granted to Nathan Thompson, February 22, 1870; and I do not claim such construction; but Having described my invention, I declare the following to be the novel and essential part thereof—

The improved washer, formed of the face-plate or follower C provided with the radial central tube $a$ and the socket or flanged disk A, relatively constructed and arranged as shown and described, whereby the nut, when screwed down, will follow the face-plate into the socket, as specified.

To the above specification of my invention I have signed my hand this 17th day of October, A. D. 1871.

CASPER DITTMAN.

Witnesses:
SOLON C. KEMON,
THOS. D. D. OURAND.